United States Patent
Roy et al.

(10) Patent No.: US 7,386,664 B1
(45) Date of Patent: Jun. 10, 2008

(54) METHOD AND SYSTEM FOR MIRROR STORAGE ELEMENT RESYNCHRONIZATION IN A STORAGE VIRTUALIZATION DEVICE

(75) Inventors: Subhojit Roy, Pune (IN); Prasad Limaye, Pune (IN); Mukul Kumar, Pune (IN); Niranjan S. Pendharkar, Pune (IN); Arun M. Rokade, Dombivli (IN); Shishir S. Asgaonkar, Pune (IN); Ashish K. Saxena, Guna (IN); Pooja Sarda, Sikkim (IN); Prasad K. Dharap, Pune (IN); Anand A. Kekre, Pune (IN)

(73) Assignee: Symantec Operation Corporation, Cupertino, CA (US)

( * ) Notice: Subject to any disclaimer, the term of this patent is extended or adjusted under 35 U.S.C. 154(b) by 665 days.

(21) Appl. No.: 10/964,526

(22) Filed: Oct. 13, 2004

(51) Int. Cl.
*G06F 12/00* (2006.01)
(52) U.S. Cl. .................. 711/114; 711/161; 711/162; 714/6
(58) Field of Classification Search .............. None
See application file for complete search history.

(56) References Cited

U.S. PATENT DOCUMENTS 7,200,664 B2 * 4/2007 Hayden .................. 709/226

* cited by examiner

*Primary Examiner*—Reginald Bragdon
*Assistant Examiner*—Mehdi Namazi
(74) *Attorney, Agent, or Firm*—Campbell Stephenson LLP

(57) ABSTRACT

A method and system for mirror storage element resynchronization in a storage virtualization device is disclosed. According to one embodiment of the present invention, a read operation on a region of a data volume is received at a first module of a first storage virtualization device where the data volume is associated with at least a first mirror storage element and a second mirror storage element, a state indicated by a bit corresponding to the region of the data volume within a first synchronization map is determined in response to receiving the read operation, the read operation is processed using the first module if the bit is determined to indicate a first state and using a second module of the first storage virtualization device if the bit is determined to indicate a second state.

25 Claims, 4 Drawing Sheets

METHOD AND SYSTEM FOR MIRROR STORAGE ELEMENT RESYNCHRONIZATION IN A STORAGE VIRTUALIZATION DEVICE

BACKGROUND

1. Technical Field

The present invention relates to data storage and retrieval generally and more particularly to a method and system for mirror storage element resynchronization in a storage virtualization device.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Storage virtualization is one technique used to minimize data loss and to improve the flexibility, accessibility, and availability of data storage. Storage virtualization is the pooling of physical storage from multiple storage devices into what appears from a user or user application perspective to be a single storage device. Storage virtualization is often used as part of a storage area network (SAN). A virtual storage device appears as one storage device, regardless of the types of storage devices (e.g., hard disk drives, tape drives, or the like) pooled to create the virtualized storage device. Storage virtualization may be performed in a host data processing system, a SAN fabric, or in storage devices directly.

Mirrored storage or "mirroring" is another commonly used storage technique. In a mirrored storage environment, a user is presented with a data volume made up of or associated with a number of mirror storage elements. Each write operation or "update" to the data volume is converted (e.g., by a volume manager or the like) into a write operation to each of the mirror storage elements such that all the data of the data volume is replicated onto each of the mirror storage elements. Mirrored storage provides decreased latency for "read" input/output (I/O) operations as a number of read operations can be distributed evenly over all available mirror storage elements, thus increasing available bandwidth and I/O rate in proportion to the number of mirror storage elements. Mirrored storage further provides increase reliability by providing redundant storage of data. Since there are one or more duplicate copies of every block of data, the failure of a disk associated with only one mirror storage element will not cause the data of the data volume to become unavailable.

Mirrored storage does suffer from a number of drawbacks. While read I/O operation latency is decreased by using mirrored storage, "write" I/O operation or "update" latency is actually increased. As each write operation must be translated into "n" physical write operations where "n" is the number of mirror storage elements associated with a volume, write operation latency will be slightly greater than that experienced with a write to an un-mirrored data volume even where all write operations can be initiated concurrently. Mirrored storage also requires "n" times the physical storage of an un-mirrored data volume without providing any increase in storage capacity.

Another significant problem associated with mirrored storage is that mirror storage elements may become inconsistent, for example, following a power failure of underlying physical storage devices, or the failure of hardware or software associated with an element responsible for generating and performing the additional write operations to mirror storage elements of a data volume (e.g., a volume manager or its underlying hardware system). Consider for example a data volume associated with two mirror storage elements. A write operation is issued to a volume manager, which converts it into two concurrent write operations, one for each mirror storage element. If at least one of the concurrent write operations fail while at least one succeeds for any reason (e.g., due to intervening read operations coupled with a failure of a volume manager or its underlying hardware) synchronization between the different mirror storage elements will be lost.

When synchronization between two mirror storage elements is lost, i.e., the mirror storage elements are "out of synch" with respect to one another, each mirror storage element contains different data for at least one region impacted by a failed write. Consequently, a read operation to the region could return either "old" or "new" data (i.e., data with or without the failed write operation applied) depending on which mirror storage element is used to service or process the read. Moreover, repeated read operations may return different data without an intervening write operations depending on what algorithm is used to select the mirror storage element from which a read is serviced. In this case the mirror storage elements are said to be out of sync with respect to one another and their associated data volume(s) must be recovered by "resynchronizing" all mirror storage elements before being used effectively again.

One technique for resynchronizing mirror storage elements during mirrored data volume recovery is to prevent any access, or at least any read access, to a data volume associated with mirror storage elements until all data from one mirror storage element is copied into all others. While guaranteeing that consistent data is returned upon its completion, this technique may take an unacceptably long period of time depending on the size of the data volume, the number of mirror storage elements, and the type of data stored. Another technique for resynchronizing mirror storage elements is to put an associated data volume in so-called "resync" or "read/writeback" mode. Once a read/writeback mode is entered, any read operation to a data volume will be serviced from one of the data volume's mirror storage elements, with the data of the read operation being copied to each of the other associated mirror storage elements. Accordingly, read operation performance is at least somewhat degraded due to the additional copying operations. Data of the selected mirror storage element may additionally be copied to each of the remaining mirror storage elements using a background or opportunistic process. Once all mirror storage elements are synchronized, the read/writeback mode may be exited and read operations handled normally.

Another technique utilized in the resynchronization of mirror storage elements independent of or in conjunction with read/writeback mode is so-called "dirty region logging" (DRL). Using DRL, when a write operation is received for a region of a data volume being mirrored, a "dirty" indicator is associated with the region. After the write operation's data is applied to each mirror storage element of the data volume, the dirty indicator is removed (e.g., using a least-recent algorithm or the like). Consequently, only those regions which are potentially out of synch with respect to one another and so identified as "dirty" need be resynchronized and the amount of downtime (where the data volume is made unavailable until all mirror storage elements are resynched) or the duration of time subject to degraded performance associated with read/writeback mode is reduced.

In host-based storage virtualization systems, read/writeback mode and DRL may be implemented relatively easily. In other storage virtualization environments however, a number of difficulties have arisen with the attempted use of such techniques. In switch-based storage virtualization systems for example, virtualization operations may be partitioned between an input/output module including specialized hardware (e.g., an application specific integrated circuit or "ASIC" or a proprietary architecture processor, or the like) and a control module including generalized hardware in combination with software (e.g., a general purpose processor). In operation, such bifurcated storage virtualization devices typically service the majority of input/output (e.g., read and write operation) requests and perform any associated translation between virtual and physical addresses, using only an I/O module. More complex tasks, (e.g., configuring the I/O module to perform address translation, performing dirty region logging, or the like) are then usually performed by a control module. Consequently, read operations can be typically performed to an unmirrored data volume very quickly by the specialized hardware of an I/O module without the intervention of a slower, more general-purpose control module.

When data volume recovery is implemented in such bifurcated storage virtualization environments however, all I/O operations including read operations necessitate a transition between I/O and control modules (e.g., to perform DRL for writes and additional processing such as copying data to multiple mirror storage elements in read/writeback mode or an examination of a control module-maintained DRL for reads) through a "fault" mechanism which causes an interrupt and context switch and consequently a delay of the ordinary processing of I/O operations. As the processing of I/O operations in such bifurcated virtualization systems, including read operations, always requires a fault or other delay or alternatively the inaccessibility of a data volume until recovery/resynchronization can be completed, substantial latency may be added.

SUMMARY

Disclosed is a method and system for mirror storage element resynchronization in a storage virtualization device. According to one embodiment of the present invention, a read operation on a region of a data volume is received at a first module of a first storage virtualization device where the data volume is associated with at least a first mirror storage element and a second mirror storage element, a state indicated by a bit corresponding to the region of the data volume within a first synchronization map is determined in response to receiving the read operation, the read operation is processed using the first module if the bit is determined to indicate a first state and using a second module of the first storage virtualization device if the bit is determined to indicate a second state. Embodiments of the present invention may be used to reduce the number of faults, and consequently the latency associated with resynchronizing mirror storage elements during data volume recovery when implemented in a storage virtualization device having multiple processing elements or modules.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Figure 1:
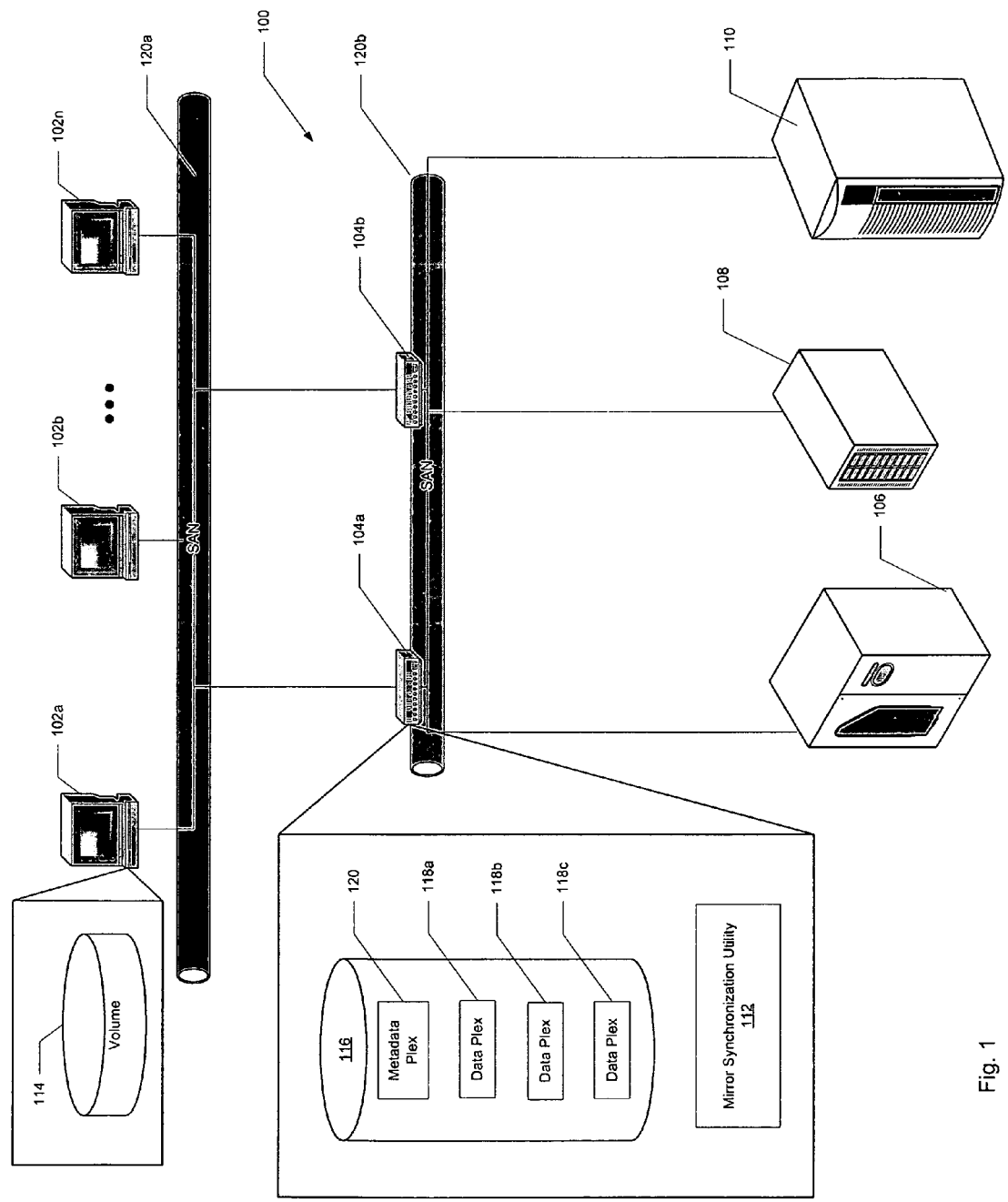
FIG. 1 illustrates a data processing system including a mirror synchronization utility according to an embodiment of the present invention.

FIG. 1 illustrates a data processing system including a mirror synchronization utility according to an embodiment of the present invention. Data processing system 100 of the illustrated embodiment of FIG. 1 includes a number system nodes including host computer systems 102*a*-102*n*, virtualization switches 104*a* and 104*b*, and storage devices such as tape library 106, a disk drive group 108 (i.e., "just a bunch of disks" or JBOD storage), and storage array 110 coupled together via storage area networks (SANs) 120*a* and 120*b* or network segments as shown. Virtualization switch 104a in the embodiment of FIG. 1, includes a mirror synchronization utility as further described herein and virtualizes one or more portions of storage devices into one or more data volumes for use by applications resident on host computer systems 102 and/or virtualization switches 104.

In general, a data volume is a virtual device or disk representing an addressable range of disk blocks used by applications such as file systems or databases. Thus, a volume is presented by a virtualization device such as virtualization switch 104a to applications, databases, and file systems as a monolithic physical disk device as depicted by storage element 114, without the physical limitations of a physical disk device. In some examples, a volume is logically formed from one or more subdisks, each subdisk comprising a set of contiguous disk blocks. Thus, a physical disk drive being subjected to virtualization may be divided into one or more subdisks. Moreover, these physical disk drives can be organized into one or more disk groups. In general, a disk group is a collection of disks that share a common configuration, e.g., a set of records containing detailed information on the objects created to support the virtualization scheme (such as disk and volume attributes) and their relationships.

Disk groups provide logical collections that facilitate management of the virtualization scheme. For example, in many embodiments a given volume is configured from disks that belong to the same disk group. In still a further refinement, subdisks are organized into one or more virtual devices called plexes which are in turn used to form volumes. Such plexes are commonly used as mirror storage elements to construct a volume. Accordingly, from a virtualization device's perspective (illustrated by storage element 116) a data volume may contain a number of plexes to which data and write operations may be replicated. More specifically, data element 116 of the embodiment of FIG. 1 includes a number of data plexes 118a-118c used as mirror storage elements to store data (e.g., application data) written to a data volume presented to one or more of host computer systems 102a-102n, and a metadata plex 120 used to store metadata used by a virtualization device such as virtualization switch 112 to perform operations on data element 116. For example, metadata plex 120 may include a dirty region log bitmap used to resynchronize one or more of data plexes 118a-118c. Numerous different schemes can be used to organize portions of or entire physical disks and present them as virtual devices. The volume description presented in this application is but one example and should not be considered as a limiting example in the context of the present invention.

Figure 2:
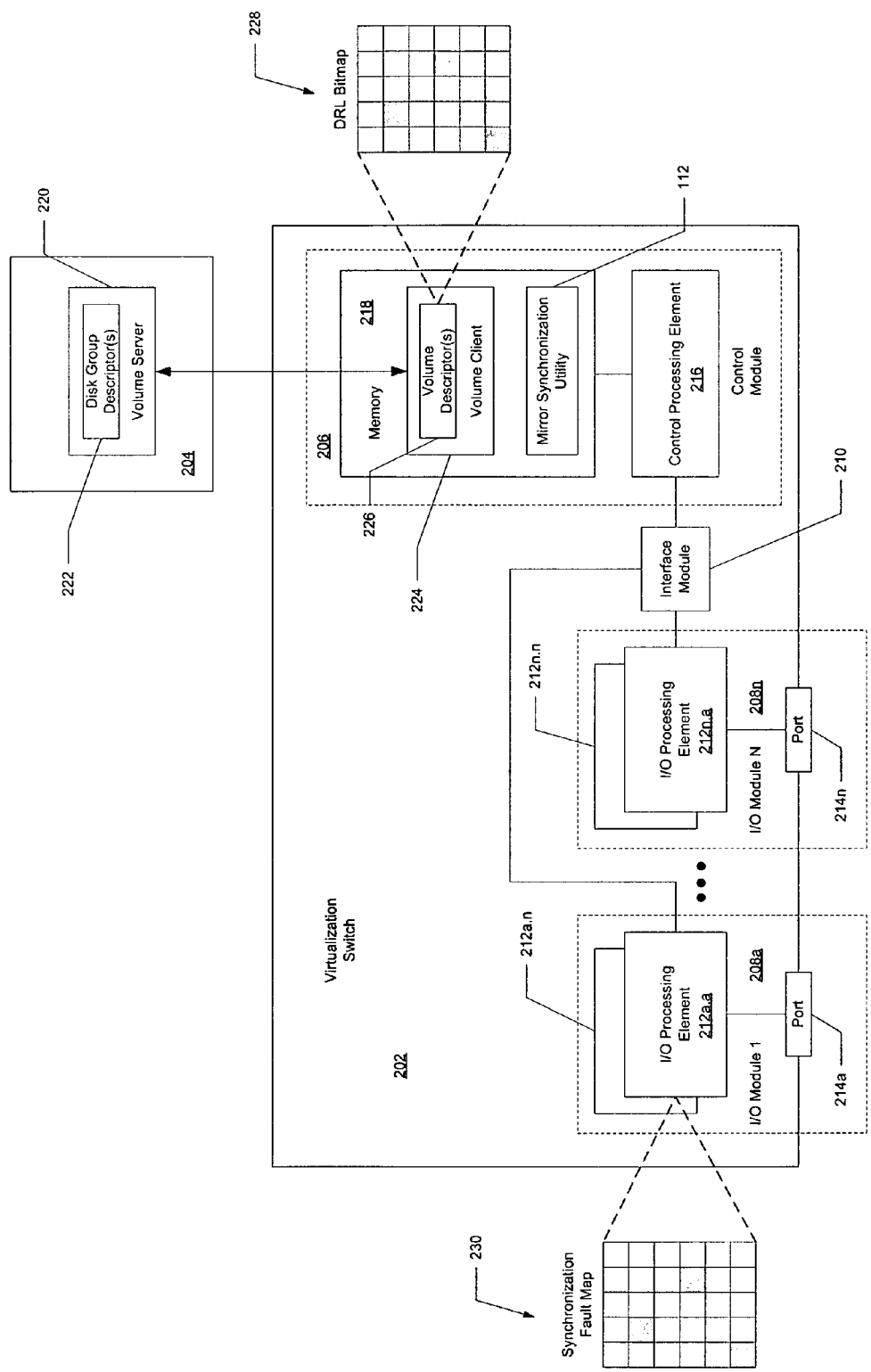
FIG. 2 illustrates a block diagram of a virtualization switch and associated host computer system according to an embodiment of the present invention.

FIG. 2 illustrates a block diagram of a virtualization switch and associated host computer system according to an embodiment of the present invention. In the illustrated embodiment of FIG. 2, a virtualization switch 202 and an associated host computer system 204 are depicted. Virtualization switch 202 includes a control module 206 coupled to one or more input/output (I/O) modules 208a-208n via an interface module 210. Each I/O module in turn includes one or more processing elements 212a.a-212n.n (e.g., application-specific integrated circuits, special-purposes processors, or the like) and a port 214a-214n, respectively. Control module 206 includes a control processing element 216 (e.g., a general-purpose processor) and an associated memory 218.

Host computer system 204 of the illustrated embodiment of FIG. 2 includes a virtual device configuration server, volume server 220, including one or more disk group descriptors 222 and in communication with a virtual device configuration client, volume client 224, including a volume descriptor 226 within memory 218 of control module 206. While disk group descriptor 222 includes the virtual or logical to physical mappings and associated metadata of a disk group including one or more volumes, volume descriptor 224 includes such mapping and metadata for a single data volume. Volume descriptor 224 of the illustrated embodiment of FIG. 2 further includes a dirty region log (DRL) bitmap 228 used to indicate the completion by the application of a write operation to two or more mirror storage elements (e.g., plexes) associated with the descriptor's data volume. In an alternative embodiment of the present invention, a volume descriptor includes mapping and metadata for a group of dependent or linked volumes (e.g., where the volumes together represent the state of a single data volume as it incrementally changed over time).

According to one embodiment of the present invention, volume server 220 imports disk group descriptor 222 and subsequently polls for attach requests for volumes with the described disk group from virtual device configuration clients such as volume client 224. Once such a request is received, a data volume descriptor (e.g., volume descriptor 226) is provided from disk group descriptor 222 to the requesting virtual device configuration client. The virtual device configuration client (volume client 224) then uses the received volume descriptor to configure I/O module 208a. More specifically, data of DRL bitmap 228 is copied to a synchronization fault map 230 within one or more of I/O processing elements 212a.a-212a.n and mapping information is similarly provided to I/O module 208a to enable its processing of I/O operations. Memory 218 of the embodiment of FIG. 2 further includes a mirror synchronization utility 112 as further described herein.

Figure 3:
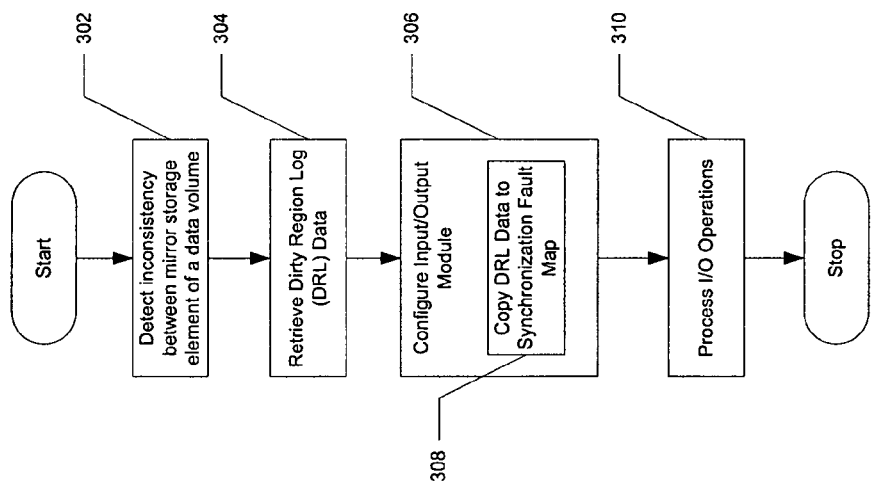
FIG. 3 illustrates a flow diagram of a data volume recovery process according to an embodiment of the present invention.

FIG. 3 illustrates a flow diagram of a data volume recovery process according to an embodiment of the present invention. In the illustrated process embodiment, an inconsistency (i.e., a lack of synchronization) between mirror storage elements of a data volume is initially detected (process block 302). Lack of synchronization may be caused by any of a number of events. For example, in one embodiment a synchronization failure between mirror storage elements may be caused by a hardware of software failure of a virtualization switch or other virtualization device during a write operation such that the write has been applied to some but not all mirror storage elements. Such a failure may be detected by the absence of an expected signal (e.g., a heartbeat signal periodically transmitted between virtualization switches/device and/or other entities), the transmission of an explicit failure signal, or the failure of a virtualization switch/device to respond as expected to a stimulus or query. In other embodiments of the present invention, lack of synchronization may be caused by other events, such as the failure of a physical storage device upon which one or more mirror storage elements are stored, failure of a communication link to one or more mirror storage elements, corruption of data on one or more mirror storage elements caused by malicious or malfunctioning software resident within a virtualization switch or device or elsewhere.

Thereafter, dirty region log (DRL) bitmap data is retrieved (process block 304). Where the detected lack of synchronization is caused by the failure of a virtualization switch or device, such DRL bitmap data may be retrieved by a virtualization switch or device other than the one whose failure was previously detected (e.g., either the virtualization switch or device who detected the failure or an alternate virtualization switch or device according to one embodiment of the present invention). Such data may be retrieved by obtaining mapping data for a volume or storage element (e.g., a plex) upon which such DRL bitmap data is stored, or by receiving such data directly from a volume server. Once the DRL bitmap data has been obtained, it, along with other mapping and metadata associated with a data volume, is used to configure an I/O module (process block 306). In the illustrated embodiment of FIG. 3, such configuration includes, at least, the copying or transfer of the received DRL bitmap data into a synchronization fault map of the I/O module to be configured (process block 308). The configured I/O module may then be utilized to process or service incoming I/O operations (process block 310) e.g., read and write operations to the associated data volume.

Figure 4:
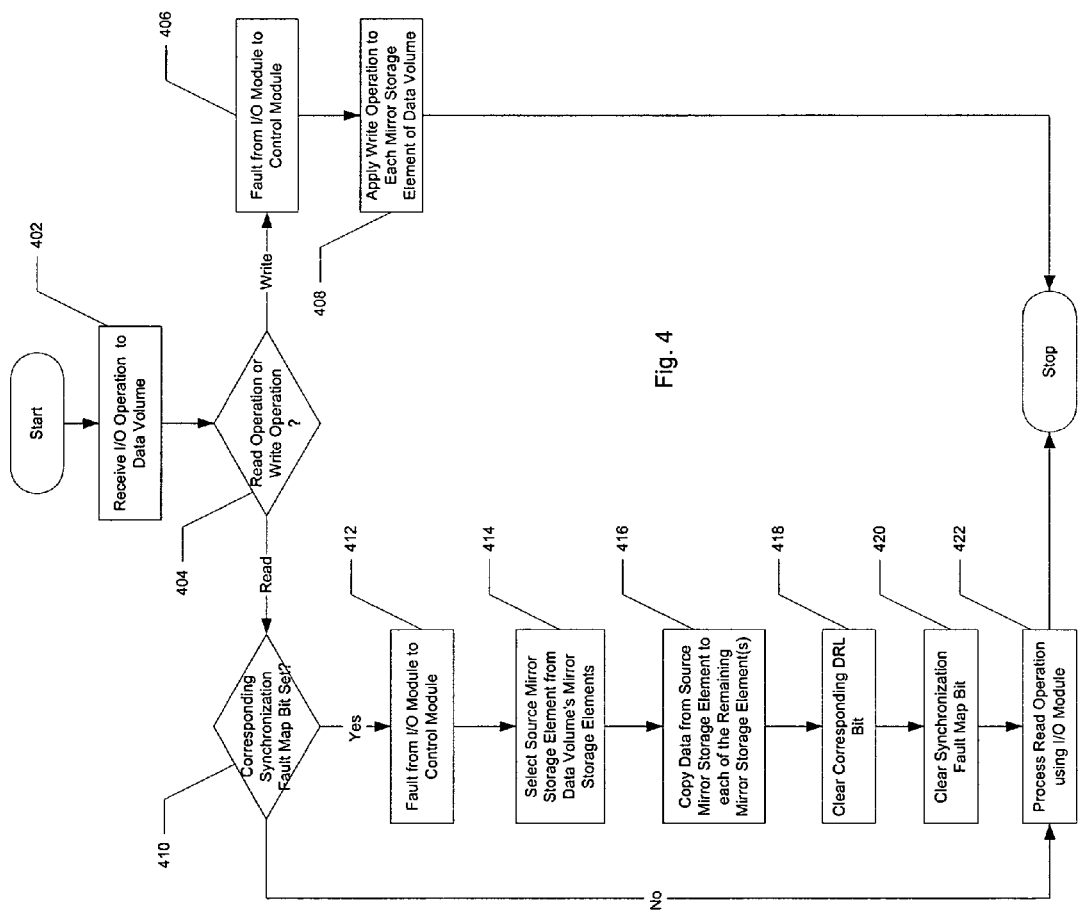
FIG. 4 illustrates a flow diagram of an input/output operation processing process according to an embodiment of the present invention.

FIG. 4 illustrates a flow diagram of an input/output operation processing process according to an embodiment of the present invention. In the illustrated process embodiment, an I/O operation (e.g., a read operation or an "update" or write operation) is initially received (process block 402). Thereafter, a determination is made whether the received I/O is a write or a read (process block 404). If the received I/O is determined to be a write operation, a fault is generated, transferring control from the I/O module which received the I/O operation to an associated control module (process block 406). The write operation data is then applied to each mirror storage element associated with the target data volume (process block 408) before additional I/O operations are received. In an alternative embodiment however, a received write operation is applied without the generation of a fault as illustrated in FIG. 4. In the described embodiment, synchronization of a region which is "out of synch" as indicated, for example, by a corresponding synchronization fault bitmap bit or entry being set, is delayed until the next read operation to the region is received.

According to yet another alternative embodiment of the present invention, another determination is made (not illustrated) whether a received write operation modifies each portion of a region identified by a DRL bitmap bit. If the write operation will not affect every portion of such a region, the region is first synchronized (e.g., by copying data from a corresponding region of a source mirror storage element to a corresponding region of all other associated mirror storage elements) before a corresponding DRL bitmap bit is cleared and the write operation is completed. If a determination is made that the received write operation modifies an entire region identified by a DRL bitmap bit (e.g., where write operation and DRL bitmap region granularity are the same) no synchronization is necessary.

According to one embodiment, if the received write operation was the first write to a region of data volume indicated as being "dirty" (i.e., not synchronized) by a synchronization fault bitmap entry following the failure of an associated virtualization device (and consequently following failover to the current virtualization device or switch) a corresponding DRL bitmap entry or bit would be modified to indicate synchronization (e.g., cleared or set to logical "0") via a mirror synchronization utility process. In another embodiment of the present invention, a periodic process or "cleaning cycle" is used to clear or modify the corresponding DRL bitmap entry such that it need not be done immediately following synchronization.

If the received I/O is determined to be a read operation, a subsequent determination is made whether a corresponding synchronization fault bitmap bit or entry is set, indicating a lack of synchronization among all of the mirror storage elements of a data volume (process block 410). If the synchronization fault bitmap bit or entry indicates that the all mirror storage elements should be consistent, the read operation is processed immediately using the I/O module (process block 422) and no additional latency is introduced. If however, one of the mirror storage elements of the data volume is out of sync as indicated by the corresponding bitmap entry, a fault is generated, transferring control from the I/O module which received the read operation to an associated control module (process block 412). Next a source mirror storage element is selected from among the mirror storage elements associated with the data volume to be read from (process block 414). Such a selection may be based upon any of number of factors, (e.g., a default preferred or primary mirror storage element, the least frequently access mirror storage element, the mirror storage element in closest physical proximity to each of the remaining mirror storage elements, or the like) or may be random.

Once selected, data (e.g., data corresponding to the data volume region to be read) is copied from the source mirror storage element to all remaining mirror storage elements (process block 416). According to one or more embodiments of the present invention, other I/O operations (e.g., read and/or write operations) to the data volume region to be read are held (e.g., by storing them elsewhere for application at a later time) or blocked while data is being copied between the source mirror storage element and remaining mirror storage elements. A corresponding DRL bitmap bit is the modified or cleared to indicate that mirror storage element consistency has been obtained (process block 418). Similarly, the synchronization fault bitmap bit or entry which precipitated the read operation's fault is modified to prevent the generation of subsequent faults (process block 420). Thereafter, the received read operation is processed using an associated I/O module (process block 422) prior the receipt of subsequent I/O operations for processing.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method comprising:
   receiving a read operation on a region of a data volume at a first module of a first storage virtualization device, wherein
      said data volume comprises at least a first mirror storage element and a second mirror storage element, and
   determining a state indicated by synchronization data corresponding to said region of said data volume in response to receiving said read operation, wherein
      said synchronization data is stored in a first synchronization map;
   processing said read operation using said first module if said synchronization data is determined to indicate a first state;
   processing said read operation using a second module of said first storage virtualization device if said synchronization data is determined to indicate a second state, wherein
      said second module comprises a second processing device configured to process input/output operations including said read operation and to maintain said first synchronization map;
   receiving a second synchronization map from a second virtualization device at said first virtualization device; and copying said second synchronization man to said first synchronization map using said second processing device, following a failure of said second virtualization device.

2. The method of claim 1, wherein said synchronization data comprises a bit within said first synchronization map.

3. The method of claim 2, wherein
said first module comprises a first processing device configured to process input/output operations including said read operation, and
said processing said read operation using said first module comprises mapping said read operation to a region of a storage device using said first processing device.

4. The method of claim 1, wherein said receiving said second synchronization map comprises
receiving a storage element descriptor of a storage element storing said second synchronization map.

5. The method of claim 1, further comprising:
maintaining said second synchronization map using said second virtualization device prior to said failure.

6. The method of claim 5, wherein said maintaining comprises:
causing a bit corresponding to said region of said data volume within said second synchronization map to indicate said first state when a write operation to said region of said data volume is received; and
causing said bit within said second synchronization map to indicate said second state when said write operation has been applied to each of said first mirror storage element and said second mirror storage element.

7. The method of claim 1, wherein said processing said read operation using said second module comprises:
receiving a fault generated by said first module at said second module;
synchronizing said first mirror storage element and said second mirror storage element; and
clearing said fault.

8. The method of claim 7, wherein said synchronizing comprises:
copying data corresponding to said region of said data volume from said first mirror storage element to said second mirror storage element; and
causing a bit corresponding to said region of said data volume within said second synchronization map to indicate said first state.

9. The method of claim 1, further comprising:
receiving a write operation to said region of said data volume;
determining whether said bit within said first synchronization map indicates said second state in response to receiving said write operation;
causing a bit corresponding to said region of said data volume within said second synchronization map to indicate said first state using a first process if said write operation is an initial write operation following said failure; and
causing said bit corresponding to said region of said data volume within said second synchronization map to indicate said first state using a second process if said write operation is not an initial write operation following said failure.

10. The method of claim 1, wherein said storage virtualization device comprises a switch.

11. A machine-readable storage medium having a plurality of instructions executable by a machine embodied therein, wherein said plurality of instructions when executed cause said machine to perform a method comprising:

receiving a read operation on a region of a data volume at a first module of a first storage virtualization device, wherein
said data volume comprises at least a first mirror storage element and a second mirror storage element, and
determining a state indicated by synchronization data corresponding to said region of said data volume in response to receiving said read operation, wherein said synchronization data is stored in a first synchronization map;
processing said read operation using said first module if said synchronization data is determined to indicate a first state;
processing said read operation using a second module of said first storage virtualization device if said synchronization data is determined to indicate a second state, wherein
said second module comprises a second processing device configured to process input/output operations including said read operation and to maintain said first synchronization map;
receiving a second synchronization map from a second virtualization device at said first virtualization device; and
copying said second synchronization map to said first synchronization map using said second processing devices following a failure of said second virtualization device.

12. The machine-readable storage medium of claim 11, wherein said synchronization data comprises a bit within Hall said first synchronization map.

13. The machine-readable storage medium of claim 12, wherein
said first module comprises a first processing device configured to process input/output operations including said read operation, and
said processing said read operation using said first module comprises
mapping said read operation to a region of a storage device using said first processing device.

14. The machine-readable storage medium of claim 13, wherein said processing said read operation using said second module comprises:
receiving a fault generated by said first module at said second module;
synchronizing said first mirror storage element and said second mirror storage element; and
clearing said fault.

15. The machine-readable storage medium of claim 14, wherein said synchronizing comprises:
copying data corresponding to said region of said data volume from said first mirror storage element to said second mirror storage element; and
causing a bit corresponding to said region of said data volume within said second synchronization map to indicate said first state.

16. The machine-readable storage medium of claim 13, said method further comprising:
receiving a write operation to said region of said data volume;
determining whether said bit within said first synchronization map indicates said second state in response to receiving said write operation;
causing a bit corresponding to said region of said data volume within said second synchronization map to indicate said first state using a first process if said write operation is an initial write operation following said failure; and causing said bit corresponding to said region of said data volume within said second synchronization map to indicate said first state using a second process if said write operation is not an initial write operation following said failure.

17. An apparatus comprising:

means for receiving a read operation on a region of a data volume at a first module of a first storage virtualization device, wherein
said data volume comprises at least a first mirror storage element and a second mirror storage element;

means for determining a state indicated by synchronization data corresponding to said region of said data volume in response to a receipt of said read operation, wherein
said synchronization data is stored in a first synchronization map;

means for processing said read operation using said first module if said synchronization data is determined to indicate a first state;

means for processing said read operation using a second module of said first storage virtualization device if said synchronization data is determined to indicate a second state, wherein
said second module comprises a second processing device configured to process input/output operations including said read operation and to maintain said first synchronization map;

means for receiving a second synchronization map from a second virtualization device at said first virtualization device; and means for copying said second synchronization map to said first synchronization map using said second processing device, following a failure of said second virtualization device.

18. The apparatus of claim 17, wherein said synchronization data comprises a bit within said first synchronization map.

19. The apparatus of claim 18, wherein
said first module comprises a first processing device configured to process input/output operations including said read operation, and
said means for processing said read operation using said first module comprises
means for mapping said read operation to a region of a storage device using said first processing device.

20. The apparatus of claim 19, wherein said means for processing said read operation using said second module comprises:
means for receiving a fault generated by said first module at said second module;
means for synchronizing said first mirror storage element and said second mirror storage element; and
means for clearing said fault.

21. The apparatus of claim 20, wherein said means for synchronizing comprises:
means for copying data corresponding to said region of said data volume from said first mirror storage element to said second mirror storage element; and means for causing a bit corresponding to said region of said data volume within said second synchronization map to indicate said first state.

22. The apparatus of claim 19, further comprising:
means for receiving a write operation to said region of said data volume;
means for determining whether said bit within said first synchronization map indicates said second state in response to a receipt of said write operation;
means for causing a bit corresponding to said region of said data volume within said second synchronization map to indicate said first state using a first process if said write operation is an initial write operation following said failure; and
means for causing said bit corresponding to said region of said data volume within said second synchronization map to indicate said first state using a second process if said write operation is not an initial write operation following said failure.

23. A storage virtualization device comprising:
an input/output module configured to
receive a read operation on a region of a data volume, wherein
said data volume comprises at least a first mirror storage element and a second mirror storage element,
determine a state indicated by synchronization data corresponding to said region of said data volume in response to a receipt of said read operation, wherein
said synchronization data is stored in a first synchronization maps and
process said read operation if said synchronization data is determined to indicate a first state;
a processing devices wherein said processing device is configured to process input/output operations including said read operation and to maintain said first synchronization map; and
a control module configured to
process said read operation if said synchronization data is determined to indicate a second state, wherein
said control module comprises said processing device,
receive a second synchronization map from a second virtualization device at said first virtualization device, and
copy said second synchronization map to said first synchronization map using said processing device, following a failure of said second virtualization device.

24. The storage virtualization device of claim 23, wherein said synchronization data comprises said bit within a first synchronization map.

25. The storage virtualization device of claim 24, wherein
said input/output module comprises a first processing device configured to process input/output operations including said read operation, and
said input/output module is further configured to map said read operation to a region of a storage device using said first processing device.

* * * * *